Patented June 5, 1951

2,555,601

UNITED STATES PATENT OFFICE 2,555,601

INTERMEDIATE PRODUCTS AND PROCESSES FOR THE PREPARATION THEREOF

Melvin S. Newman, Columbus, Ohio, assignor to The Ohio State University Research Foundation, Columbus, Ohio, a corporation of Ohio No Drawing. Original application May 10, 1947, Serial No. 747,178. Divided and this application July 1, 1950, Serial No. 171,743

2 Claims. (Cl. 260—615)

This application is a divisional application of my copending application Serial No. 747,178, filed on May 10, 1947.

This invention relates to alkoxy methylhexyne diols and their esters having the formula

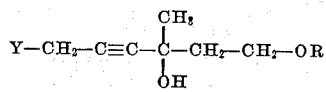

where R is a lower alkyl group and where Y is a hydroxyl or an ester thereof and to methods for their preparation.

The products of this invention are of value in the further synthesis of other chemical compounds and are of particular value in syntheses leading to the preparation of vitamin A and derivatives of vitamin A. Prior to this invention, the products of this invention have not been known nor have there been any recognized methods for their preparation.

By this invention I synthesize alkoxy methylhexyne diols and their esters. The alkoxy methylhexyne diols which I have synthesized all had alkoxy groups.

By the use of the word "alkoxy" in the last sentence, elsewhere in this specification and in the claims, I mean a compound having an alkyl group attached to the remainder of the molecule by oxygen where the alkyl group has not more than six carbon atoms and I so define the term alkoxy wherever used herein. Compounds having an alkyl group with more than four carbon atoms but not more than six carbon atoms are operative and compounds having such an alkyl group with more than six carbon atoms may be operative but in later manipulations, the compounds involved may be more difficult to handle due to the higher temperatures necessary.

An object of this invention is the preparation of new intermediate chemical compounds useful in synthesizing vitamin A, ethers thereof, similar compounds and other chemicals.

A further object of the invention is the provision of new methods of synthesizing various intermediates and other chemicals.

A further object of this invention is the preparation of a 6-alkoxy-4-methylhexyne-2-diol-1,4.

A further object of this invention is the provision of methods for the preparation of a 6-alkoxy-4-methylhexyne-2-diol-1,4.

A further object is the preparation of monoesters of a 6-alkoxy-4-methylhexyne-2-diol-1,4.

A further object is the provision of methods for the preparation of monoesters of a 6-alkoxy-4-methylhexyne-2-diol-1,4.

The process of my invention may be more readily understood by reference to the following illustrative equations, where R has the value given above, and where equations 1 to 4 illustrate the use of a magnesium halide reagent while equations 5 to 8 illustrate the use of a lithium reagent.

(1)
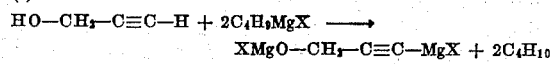

(2)
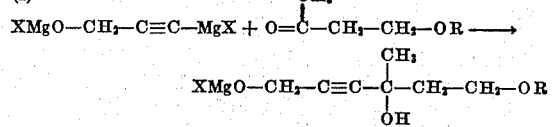

(3)
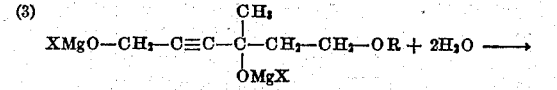

(4)
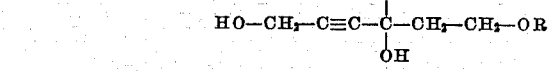

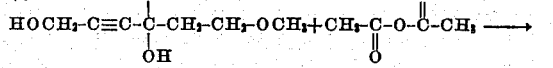

(5)

(6)
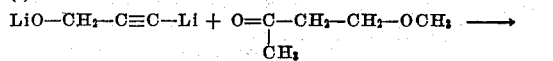

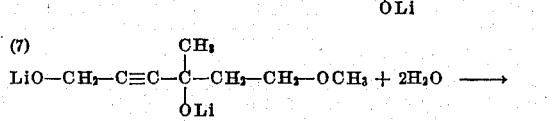

(7)
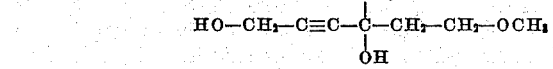

(8)
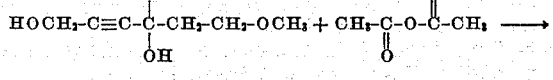

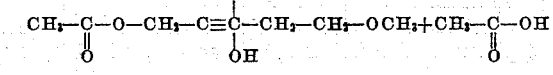

In general the process of this invention comprises the reaction of an organo-metal derivative with propargyl alcohol to prepare a propargyl alcohol metal derivative; a metal atom replacing the hydrogen of the hydroxyl group and another replacing the acetylenic hydrogen. The metal derivative is then reacted with an alkoxy butanone, to give a metal complex addition product. The metal complex addition product is then hydrolyzed to give an alkoxy methylhexyne diol. The alkoxy methylhexyne diol may be reacted with an organic acid, acid halide, or acid anhydride to give an acyloxy hydroxy alkoxy methylhexyne.

Among the metals suitable for the formation of a C–M derivative of propargyl alcohol are magnesium and lithium as given in the above examples; other alkali metals such as sodium and potassium; alkaline earth metals such as calcium, magnesium halide residues (—MgX); and other metals. The metal derivatives of propargyl alcohol are suitably made by reacting propargyl alcohol with another suitable organo metal derivative which will exchange the acetylenic hydrogen. Suitable reagents for the preparation of the propargyl metal derivatives are the Grignard Reagents (R'MgX) (where R' is a hydrocarbon radical) and metal alkyls (R'M) (where M may be any of the metals mentioned above) although the preferred reagents are magnesium reagents and phenyl and butyl lithium, it being understood, however, that others are within the scope of this invention. The hydrogen of the alcohol is also exchanged for the metal in the same manner as the acetylenic hydrogen, but the oxygen-metal derivative so formed does not undergo the addition reactions as does the carbon-metal derivative. The metal attached to the carbon upon reaction with the butanone becomes an oxygen-metal group. Both oxygen-metal derivatives are converted to hydroxyl upon hydrolsis. These metalation reactions are preferably carried out in suitable solvents. For this purpose the solvent must be inert (i. e. having no replaceable hydrogen or other reactive group) and must also be anhydrous. Ethers such as diethyl ether, dibutyl ether, and tetrahydrofurane and hydrocarbons such as pentane, hexane, benzene and toluene are among the solvents which are inert and can be obtained anhydrous. Diethyl ether or a mixture of diethyl ether and tetrahydrofurane are preferred solvents in which the reaction may be conducted.

The hydrolysis of the addition complex resulting from the addition of the propargyl metal derivative and the ketone is preferably done with water. If desired, the reaction may be cooled during the hydrolysis. When water alone is used, metal hydroxides and basic metal salts may precipitate which may make isolation of the product difficult. The addition of small quantities of acids such as hydrochloric, sulfuric and acetic or small quantitatives of inorganic salts such as ammonium salts to the water used for hydrolysis is advantageous as it renders these precipitates water soluble or otherwise easily removed. The preferred embodiment of this invention provides for the use of such an agent during hydrolysis, but of such kind and in such amount that it will not react with any of the constituents of the reaction mixture in any way so as to lead to products other than those which are an object of this invention.

The esterification of the hydroxyl group on carbon atom number one is accomplished by an acid or acid derivative such as an acid halide or the acid anhydride which are equivalents for the esterification of the diol. Any organic ester may be used. However, for ease of manipulation in subsequent reactions, esters of lower molecular weight fatty acids are preferred.

The nature of the alkoxy group on the alkoxy butanone which is condensed with the metal derivative of propargyl alcohol determines the nature of the alkoxy group in the product of this invention. This R may be any hydrocarbon radical such as alkyl, cycloalkyl, aralkyl, and aryl. In the preferred embodiment of this invention, R is a lower alkyl group such as one having four carbon atoms or less. Other hydrocarbon radicals are operative but in subsequent reactions the compounds involved may be more difficult to handle due to higher boiling temperatures.

EXAMPLE I

*Preparation of 6-methoxy-4-methylhexyne-2-diol-1,4*

A solution of 112 g. (2 moles) of propargyl alcohol in 400 cc. of dry ether was added dropwise over three hours to 2710 cc. of a stirred solution of 1.57N (4.25 moles) butylmagnesium chloride in ether. The solution was stirred at room temperature for an additional hour and then a solution of 224 g. (2.2 moles) of 4-methoxybutanone-2 added over a period of two hours. After stirring overnight, the solution was hydrolyzed with 700 cc. of saturated ammonium chloride solution. The ether layer was separated, concentrated and the residue distilled under reduced pressure.

The product was obtained as a yellowish oil, B. P. 122–125° C. at 1 to 2 mm.; yield=132.5 g. (42%); $n_D^{20}$=1.4744.

Analysis:

Calcd. for $C_8H_{14}O_3$: C, 60.7; H, 8.9.
Found: C, 61.3, 61.2; H, 9.3, 9.1.

The product has the following structural formula:

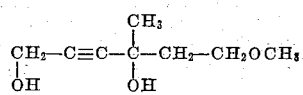

In addition, 37 g. (33% of propargyl alcohol) (B. P. 109–111° C.) was recovered from the low boiling fractions.

EXAMPLE II

*Preparation of 1-acetoxy-6-methoxy-4-methylhexyne-2-ol-4*

To a cooled (5–10° C.) solution of 198 g. (1.26 moles) of 6-methoxy-4-methylhexyne-2-diol-1,4 in 300 cc. (3+ moles) of dry pyridine was added in portions over forty-five minutes 163 g. (1.6 moles) of acetic anhydride. The solution was allowed to warm up to room temperature and stand overnight.

The desired product was isolated by distillation at reduced pressure; B. P. 110–112° C. at 1 mm.; yield=237 g. (94%); $n_D^{20}$=1.4590. It has the following structural formula:

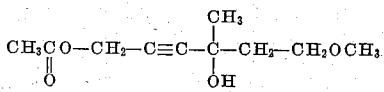

While the forms of embodiments of the present invention as herein disclosed constitute preferred forms, it is to be understood that other forms might be adopted, all coming within the scope of the claims which follow.

I claim:

1. As a composition of matter, a compound represented by the formula $$\text{HO-CH}_2-\text{C}\equiv\text{C}-\underset{\underset{\text{CH}_3}{|}}{\overset{\overset{\text{OH}}{|}}{\text{C}}}-\text{CH}_2-\text{CH}_2-\text{OR}$$

wherein R is a lower alkyl group.

2. As a composition of matter, a compound represented by the formula $$\text{HOCH}_2-\text{C}\equiv\text{C}-\underset{\underset{\text{CH}_3}{|}}{\overset{\overset{\text{OH}}{|}}{\text{C}}}-\text{CH}_2-\text{CH}_2-\text{OCH}_3$$

MELVIN S. NEWMAN.

No references cited.